(12) United States Patent
McClellan

(10) Patent No.: US 7,139,232 B2
(45) Date of Patent: Nov. 21, 2006

(54) WRITING PIXELS TO LAST FRACTIONAL PIXEL POSITIONS OF TRACKS OF OPTICAL DISCS

(75) Inventor: Paul J. McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 629 days.

(21) Appl. No.: 10/626,027

(22) Filed: Jul. 24, 2003

(65) Prior Publication Data

US 2005/0019522 A1    Jan. 27, 2005

(51) Int. Cl.
*G11B 7/00* (2006.01)
(52) U.S. Cl. ........................................ 369/100; 347/224
(58) Field of Classification Search ............... None
See application file for complete search history.

(56) References Cited

U.S. PATENT DOCUMENTS

| | | | | |
|---|---|---|---|---|
| 4,718,784 | A | * | 1/1988 | Drisko ........................ 400/68 |
| 4,967,286 | A |   | 10/1990 | Nomula et al. |
| 6,074,031 | A | * | 6/2000 | Kahle ............................ 347/4 |
| 7,038,794 | B1 | * | 5/2006 | Kurashina ................. 358/1.11 |
| 2004/0141385 | A1 | * | 7/2004 | Pettigrew et al. ........... 365/200 |
| 2005/0013964 | A1 | * | 1/2005 | Van Brocklin et al. .... 428/64.4 |
| 2006/0017754 | A1 | * | 1/2006 | Kwasny et al. ................ 347/2 |

FOREIGN PATENT DOCUMENTS

| | | |
|---|---|---|
| EP | 0297668 | 1/1989 |
| EP | 1110740 | 6/2001 |

OTHER PUBLICATIONS

U.S. Appl. No. 10/423,366, filed Apr. 23, 2003, McClellan.

* cited by examiner

*Primary Examiner*—Andrea Wellington
*Assistant Examiner*—Parul Gupta

(57) ABSTRACT

A method of one embodiment of the invention is disclosed that is for a track of an optically writable label region of an optical disc having a non-integer number of pixel positions around the track, such that a last fractional pixel position is defined. The method determines whether the size of the last fractional pixel position is greater than a fractional threshold. In response to determining that the size of the last fractional pixel position is greater than the fractional threshold, the method writes a complete pixel to the last fractional pixel position, such that the complete pixel written overlaps onto a first complete pixel position of the track.

35 Claims, 9 Drawing Sheets

FIRST PASS

SECOND PASS

THIRD PASS

FIRST PASS

SECOND PASS

THIRD PASS

WRITING PIXELS TO LAST FRACTIONAL PIXEL POSITIONS OF TRACKS OF OPTICAL DISCS

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used, but this is a laborious process: the labels must be carefully aligned on the discs, and so on. Special-purpose printers that print directly on the discs may be used, but such printers are fairly expensive. In the patent application entitled "Integrated CD/DVD Recording and Label", filed on Oct. 11, 2001, and assigned Ser. No. 09/976,877, a solution to these difficulties is described, in which a laser is used to label optical discs.

Two concerns in writing to the optically writable label side of an optical disc are image quality and speed. Users typically want the best quality of images possible when optically writing to the label side of an optical disc. However, because mass storage devices that read from and write to optical discs heretofore have been optimized for data storage, and not label marking, their characteristics may affect image quality of images written to the label sides of optical discs. Users also usually want the fastest speed when optically writing to the label side of an optical disc. Again, however, because optical disc mass storage devices have heretofore been optimized for writing to the data sides of optical discs, their characteristics may affect the speed with which the label sides of optical discs can be marked.

SUMMARY OF THE INVENTION

A method of one embodiment of the invention is for a track of an optically writable label region of an optical disc having a non-integer number of pixel positions around the track, such that a last fractional pixel position is defined. The method determines whether the size of the last fractional pixel position is greater than a fractional threshold. In response to determining that the size of the last fractional pixel position is greater than the fractional threshold, the method writes a complete pixel to the last fractional pixel position, such that the complete pixel written overlaps onto a first complete pixel position of the track.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Selectively Writing Pixels to Last Fractional Pixel Positions of Tracks

Figure 1:
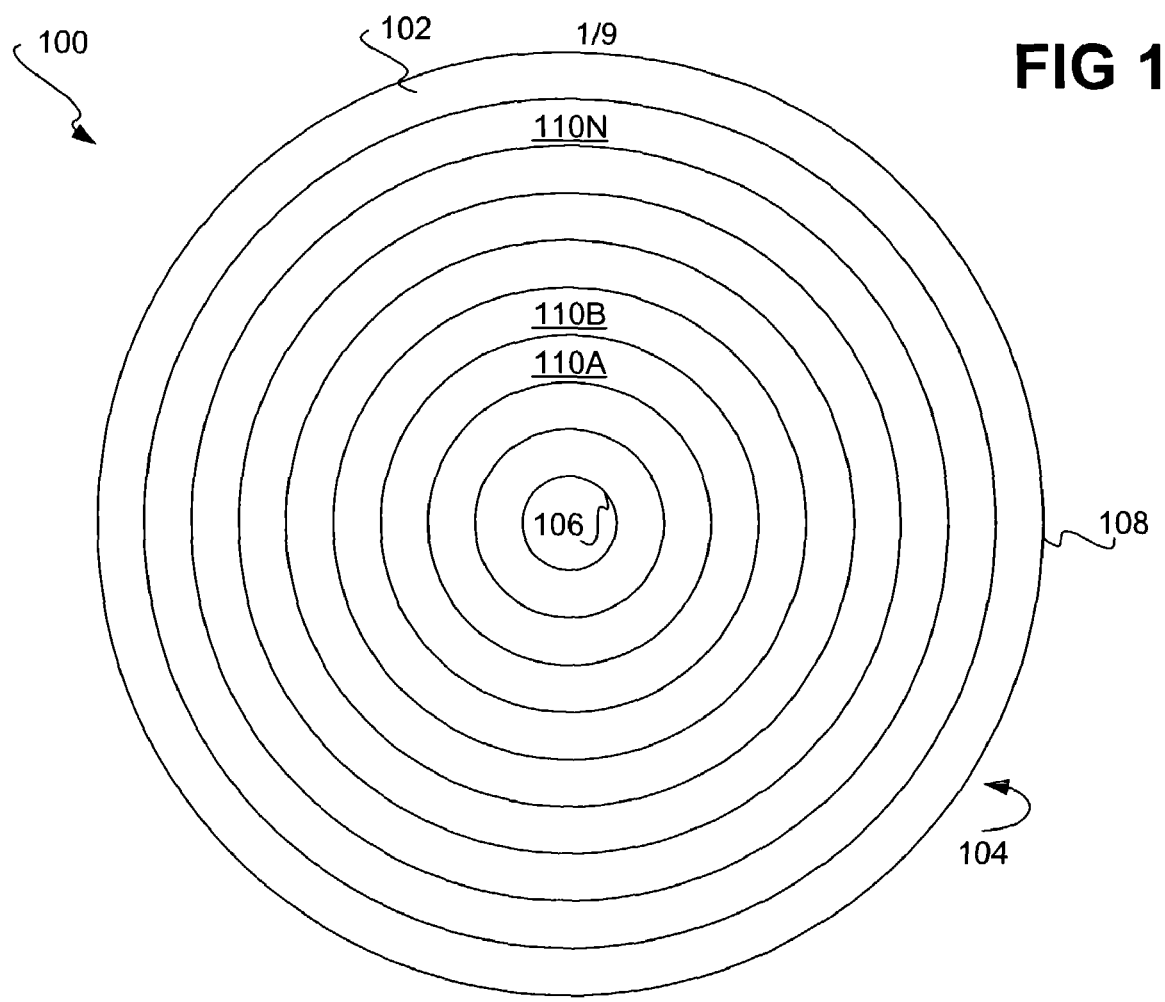
FIG. 1 is a diagram of an optical disc having an optically writable label side with a number of tracks, according to an embodiment of the invention.

FIG. 1 shows an optical disc 100, according to an embodiment of the invention. The optical disc 100 may be a compact disc (CD), a digital versatile disc (DVD), or another type of optical disc. The optical disc 100 has an optically writable label side 102, which is shown in FIG. 1, and an optically writable data side 104 on the opposite side of the optical disc 100. An example of the optically writable label side 102 is particularly disclosed in the patent application entitled "Integrated CD/DVD Recording and Label", filed on Oct. 11, 2001, and assigned Ser. No. 09/976,877. An image may be written to the label side 102, such that the pixels of the image are selectively and correspondingly optically written to the label side 102.

The label side 102 is more generally a label region, and the data side 104 is more generally a data region, in that an optically writable label region may coexist on the same side of the optical disc 100 as an optically writable data region. The optical disc 100 also has an inside edge 106 and an outside edge 108. The optical disc 100 also has a number of concentric circular tracks 110A, 110B, . . . 110N, collectively referred to as the tracks 110. An optical marking mechanism, such as a laser, may write marks, or pixels, to marking, or pixel, positions of the tracks 110. Furthermore, the term optical disc as used herein is inclusive of any circular-shaped medium that can be labeled, or having markings written to, while being rotated.

Figure 2:
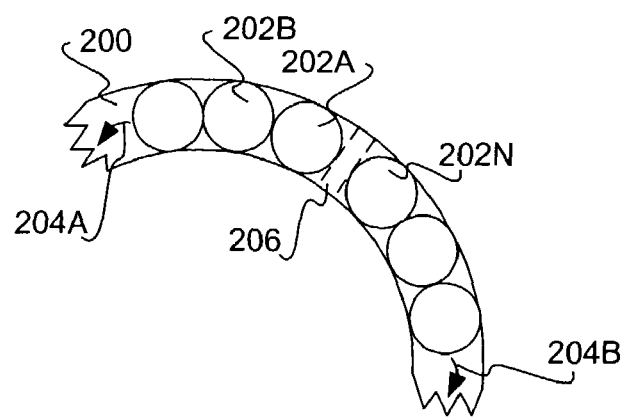
FIG. 2 is a diagram of a partial track of an optically writable label side of an optical disc showing a number of pixel positions on the track and a last fractional pixel position on the track, according to an embodiment of the invention.

FIG. 2 shows a partial track 200, which may represent any of the tracks 110 of the optically writable label side 102 of the optical disc 100 of FIG. 1, according to an embodiment of the invention. The partial track 200 has a number of complete pixel positions, starting at the first complete pixel position 202A, going around the track as indicated by the arrows 204A and 204B, and ending at the last complete pixel position 202N. The complete pixel positions 202A, 202B, . . . , 202N, are collectively referred to as the complete pixel positions 202. A complete pixel, or marking, can be written on any of the complete pixel positions 202. Each of the pixel positions 202 has the same size, such as the same width. The pixel positions 202 can be tangentially adjacent to one another, such that adjacent pixel positions 202 touch, but do not overlap, one another. Furthermore, in one embodiment, the pixels or markings that are written are ellipsoid, instead of being circular as shown in FIG. 2, and adjacent marks overlap slightly to achieve maximum optical density.

There is a gap between the last complete pixel position 202N and the first complete pixel position 202A, referred to as the last fractional pixel position 206. The last fractional pixel position 206 is fractional in that the position 206 has a size, such as its width, that is less than and a fraction of the size of any of the complete pixel positions 202, such as the width of any of the pixel positions 202. Therefore, there are a non-integer number of complete pixel positions around the track 200, encompassing the complete pixel positions 202 and the fractional pixel position 206. The size of the fractional pixel position 206 being less than and a fraction of the size of any of the complete pixel positions 202 makes the total number of complete pixel positions around the track 200 a non-integer number.

Figure 3:
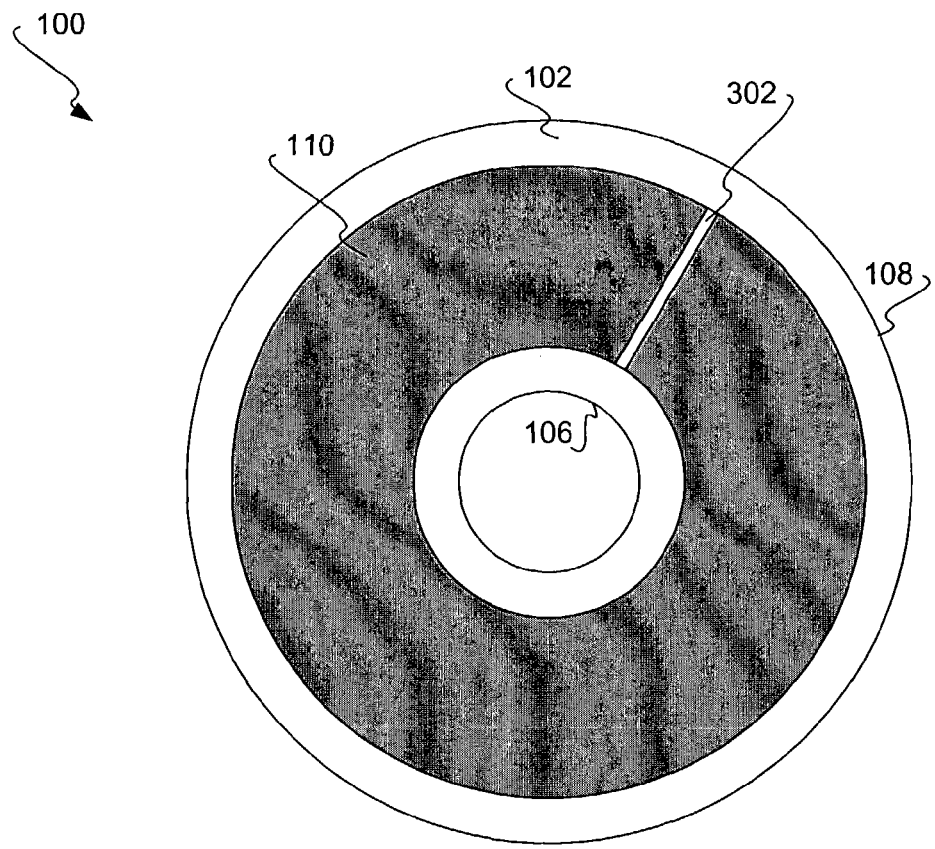
FIG. 3 is a diagram showing a faint line that results when all the pixel positions of all the tracks of an optically writable label side of an optical disc are written to, except for the last fractional pixel positions of the tracks, a situation avoided by embodiments of the invention.

FIG. 3 shows the optical disc 100 when fifty percent of the complete pixel positions of the tracks 110 of the optically writable label side 102 have pixels written thereto. That is, the optical density of pixels written to the label side 102 of the optical disc 100 is fifty percent, such that substantially every other pixel position has a pixel written thereto. A faint radial line 302 is apparent from the inside edge 106 to the outside edge 108, and is exaggerated in FIG. 3 for illustrative clarity. The radial line 302 results from the last fractional pixel positions of the tracks 110 not having any pixels written thereto. The fractional pixel positions of the tracks 110 are at least substantially collinear, such that the faint radial line 302 occurs. The scenario depicted in FIG. 3 is avoided by embodiments of the invention, as are described later in the detailed description.

Figure 4:
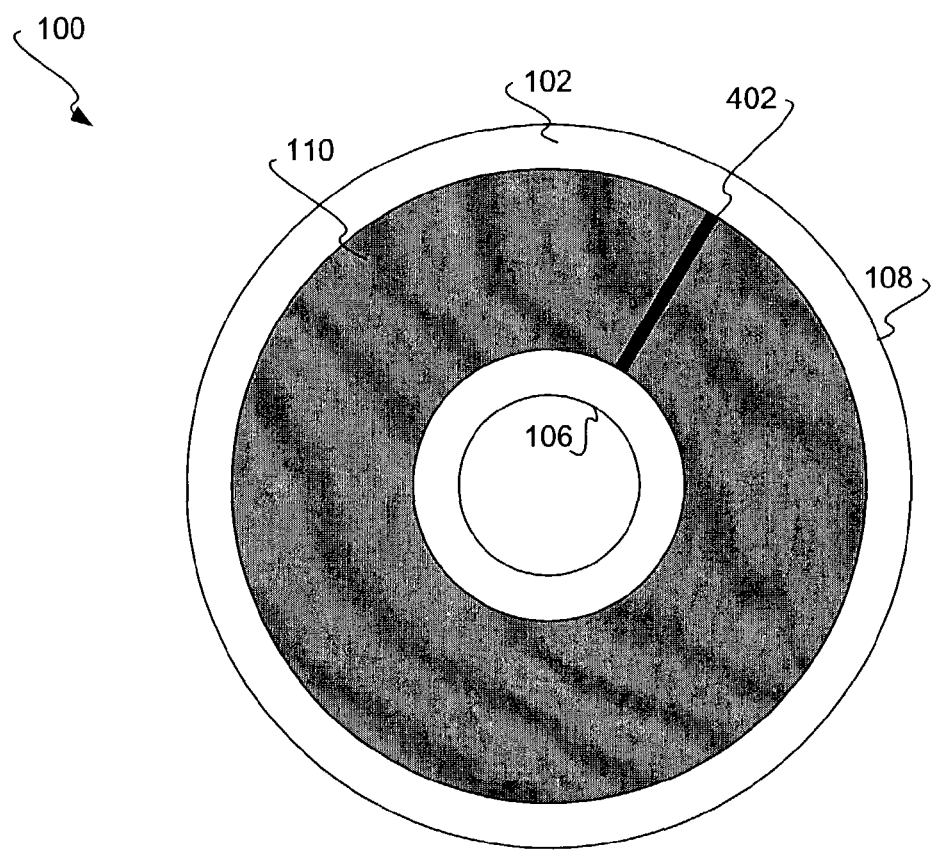
FIG. 4 is a diagram showing a faint line that results when the last fractional pixel positions of all the tracks of an optically writable label side of an optical disc are written to, and not the other, complete pixel positions of the tracks, a situation avoided by embodiments of the invention.

FIG. 4 shows the optical disc 100 when fifty percent of the complete pixel positions of the tracks 110 of the optically writable label side 102 have pixels written thereto, but all the fractional pixel positions of the tracks 110 have pixels written thereto. That is, the optical density of pixels written to the label side 102 of the optical disc 100 is fifty percent, such that substantially every other pixel position has a pixel written thereto. A faint solid radial line 402 is apparent from the inside edge 106 to the outside edge 108, and is exaggerated in FIG. 4 for illustrative clarity. The radial line 402 results from the last fractional pixel positions of the tracks 110 having pixels written thereto. The fractional pixel positions of the tracks 110 are again at least substantially collinear, such that the faint solid radial line 402 occurs. The scenario depicted in FIG. 4 is also avoided by embodiments of the invention, as are now described.

Figure 5:
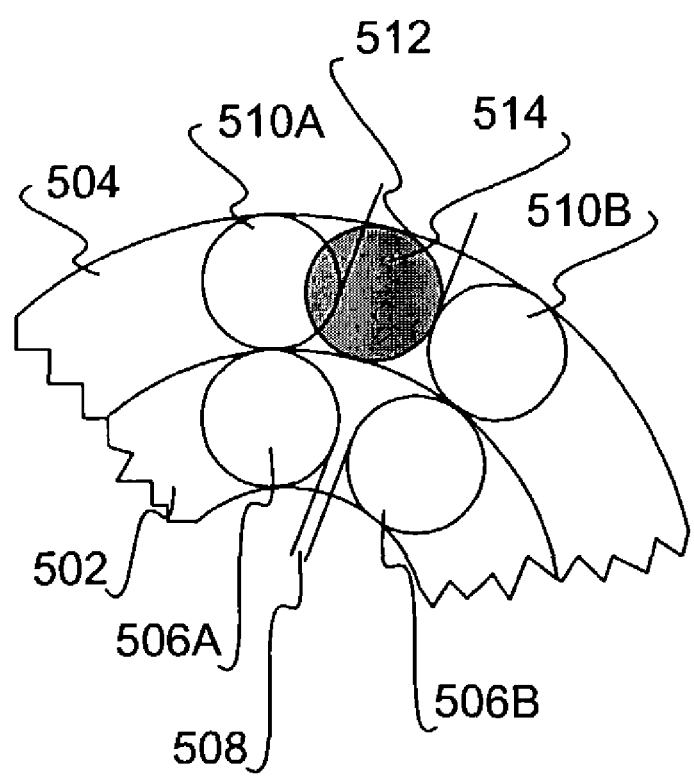
FIG. 5 is a diagram of two partial tracks of an optically writable label side of an optical disc in which the last fractional pixel position of one of the tracks has a complete pixel written thereto and the last fractional pixel position of the other track does not have a complete pixel written thereto, according to an embodiment of the invention.

FIG. 5 shows a pair of adjacent partial tracks 502 and 504, which may represent any adjacent pair of the tracks 110 of the optically writable side 102 of the optical disc 100 of FIG. 1, according to an embodiment of the invention. The track 502 has a first complete pixel position 506A, a last complete pixel position 506B, and a last fractional, or partial, pixel position 508. The size or width of the fractional pixel position 508 is less than the sizes or widths of the complete pixel positions 506A and 506B. The track 504 similarly has a first complete pixel position 510A, a last complete pixel position 510B, and a last fractional pixel position 512. The size or width of the fractional pixel position 512 is less than the sizes or widths of the complete pixel positions 510A and 510B, which are equal to the sizes or widths of the complete pixel positions 506A and 506B.

The circumference of the track 502 is smaller than the circumference of the track 504, since the tracks 502 and 504 are circular and concentric with one another. The track 504 therefore may have more complete pixel positions than the track 502 has. The last fractional pixel position 512 of the track 504 may thus be smaller or larger than the last fractional pixel position 508 of the track 502. This is because the size of the gap left over within a given track that corresponds to a fractional pixel position is equal to the size of a complete pixel position, times the number of complete pixel positions on the track, and subtracted from the circumference of the track. As depicted in FIG. 5, the last fractional pixel position 512 is larger than the last fractional pixel position 508 of the track 502, as an illustrative example.

Where the fractional pixel position of a track is greater than a threshold, a complete pixel is written to the fractional pixel position of the track, such that the complete pixel overlaps with the first complete pixel position of the track. The complete pixel that is written to the fractional pixel position may be sampled or mapped from the image that is to be written to the tracks of the optically writable label side of the optical disc. Where the fractional pixel position of a track is less than the threshold, however, no complete pixel is written to the fractional pixel position of the track.

Thus, as depicted in FIG. 5, the size of the fractional pixel position 508 of the track 502 is less than the threshold, such that no complete pixel has been written to the fractional pixel position 508. By comparison, the size of the fractional pixel position 512 of the track 504 is greater than the threshold, such that a complete pixel 514 has been written to the fractional pixel position 512. The complete pixel 514 has a size equal to the pixel positions 510A and 510B of the track 504. As a result, its size is greater than the size of the fractional pixel position 512, and thus partially overlaps the first complete pixel position 510A of the track 504.

By selectively writing complete pixels to the fractional pixel positions of the tracks of the optically writable label side of an optical disc, embodiments of the invention avoid the scenarios depicted in FIGS. 3 and 4. In FIG. 3, for instance, the faint radial line 302 would not result, because some of the fractional pixel positions that make up the faint line 302 that have sizes exceeding a threshold would have complete pixels written thereto, breaking up the faint line 302. In FIG. 4, the faint solid radial line 402 would not result, because the fractional pixel positions that make up the faint line 402 and that have sizes exceeding a threshold would have complete pixels written thereto, and thus not all of these fractional pixel positions would have complete pixels written thereto.

Figure 6:
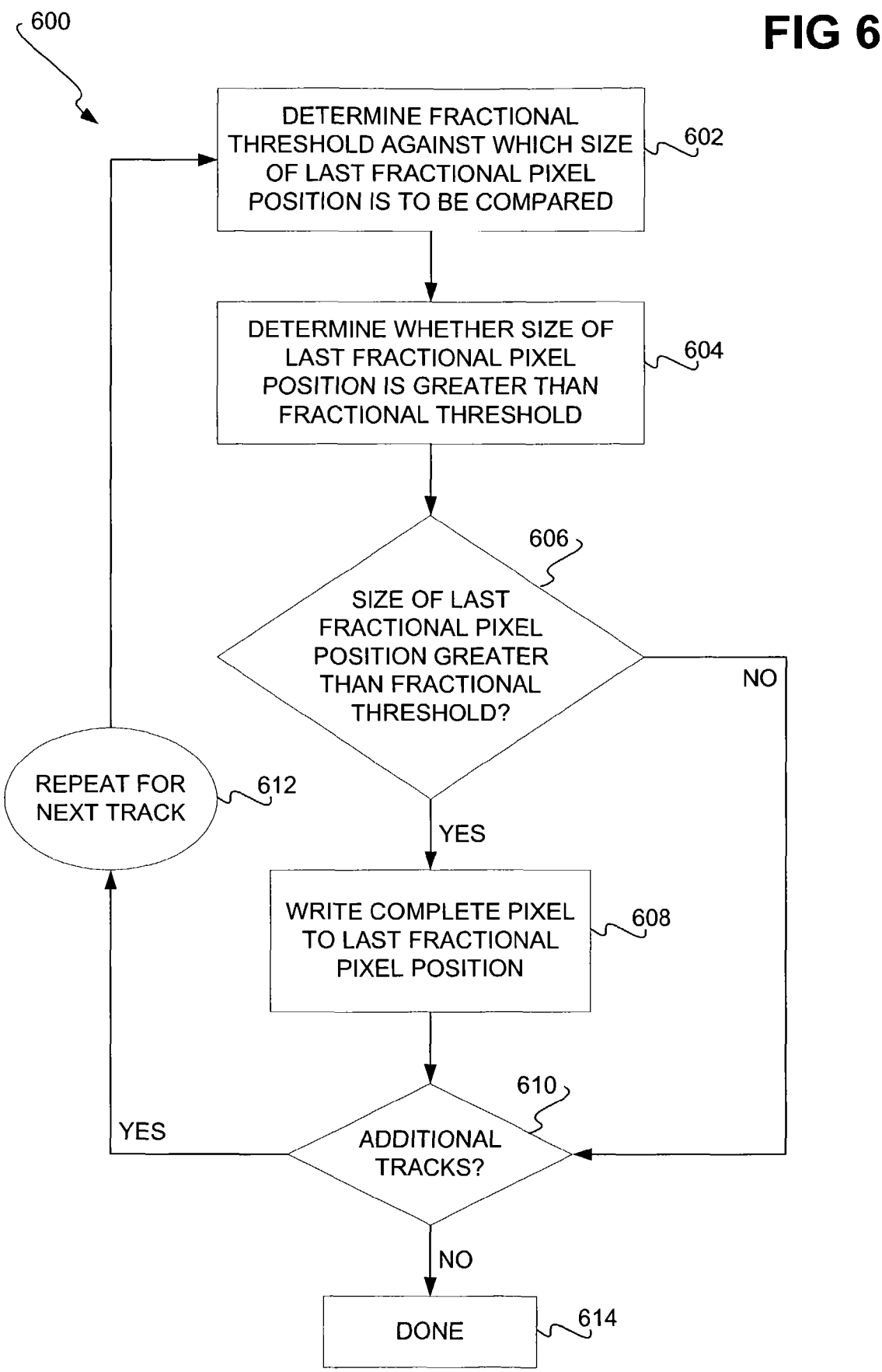
FIG. 6 is a flowchart of a method to selectively write complete pixels to the last fractional pixel positions of the tracks of an optically writable label side of an optical disc, according to an embodiment of the invention.

FIG. 6 shows a flowchart of a method 600 for selectively writing complete pixels to the fractional pixel positions of the tracks of the optically writable label side of an optical disc, according to an embodiment of the invention. For a given track, a fractional threshold is determined (602), against which the size of the last fractional pixel position is to be compared. The fractional threshold can be determined on a track-by-track basis, such that the fractional threshold is a dynamic, variable threshold. Alternatively, the fractional threshold can be set as the same for all the tracks, such that the fractional threshold is a static, unchanging threshold.

The method 600 determines whether the size of the last fractional pixel position of the track is greater than the fractional threshold (604). This may be accomplished by comparing the width of the last fractional pixel position of the track against the fractional threshold. If the size of the last fractional pixel position is greater than the fractional threshold (606), then a complete pixel is written to the fractional pixel position (608). The complete pixel that is written to the fractional pixel position may be sampled, or mapped, from the image that is to be written onto the optically writable label side of the optical disc. Thus, where the sampled complete pixel from the image to be written is a completely white pixel, then in effect no pixel is written to the fractional pixel position, even though the size of the last fractional pixel position is greater than the fractional threshold. In either case, if additional tracks remain (610), then the method 600 is repeated for another track (612). Ultimately, the method 600 is finished (614).

Dynamic Threshold to Determine When to Write to Last Fractional Pixel Position

As has been noted, the fractional threshold against which the size of the last fractional pixel position of a given track on the optically writable label side of an optical disc is to be compared can be a static or a variable, or dynamic, threshold. In one embodiment, the fractional threshold is a variable, or dynamic, threshold that changes based on the track of the last fractional pixel position to be compared against the threshold. More particularly, the dynamic threshold may be determined based on the optical density of pixels on pixel positions proximate to the last fractional pixel position. The dynamic threshold may also be determined based on other metrics that measure the lightness and darkness of pixels on proximate pixel positions, such as L*, as known within the art.

Figure 7:
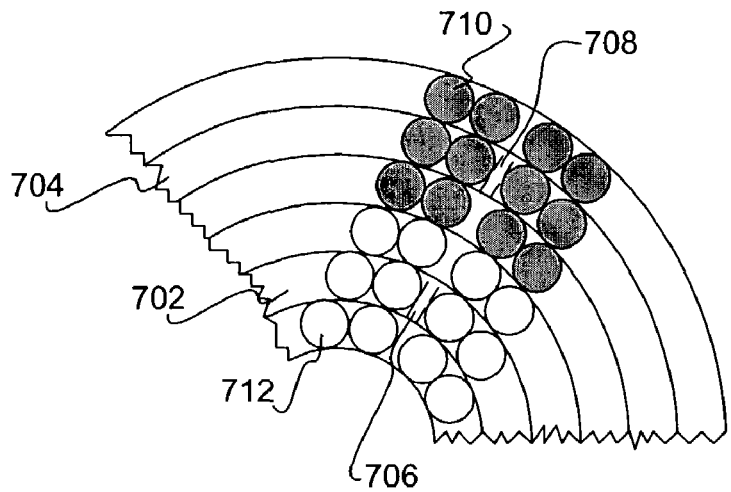
FIG. 7 is a diagram of two fractional pixel positions on non-adjacent tracks that have different optical densities of pixels on complete pixel positions proximate to the fractional pixel positions, according to an embodiment of the invention.

FIG. 7 shows two extreme example scenarios of optical pixel density on pixel positions proximate to different last fractional pixel positions, according to an embodiment of the invention. Tracks 702 and 704 are on the optically writable label side of an optical disc, and can represent two of the tracks 110 of the optically writable label side 102 of the optical disc 100 of FIG. 1. The track 702 has a last fractional pixel position 706, whereas the track 704 has a last fractional pixel position 708.

The pixel positions proximate to the last fractional pixel position 706 of the track 702, such as the pixel position 712, do not have pixels written to them, such that they are depicted in FIG. 7 as not having been filled in. Therefore, the optical density of the pixels on the pixel positions proximate to the last fractional pixel position 706 is a minimum value, such as zero. By comparison, the pixel positions proximate to the last fractional pixel position 708 of the track 704, such as the pixel position 710, have pixels written to them, such that they are depicted in FIG. 7 as having been filled in. Therefore, the optical pixel density of the pixel positions proximate to the last fractional pixel position 708 is a maximum value, such as one, where the optical density may range from zero through one.

The number of pixel positions surrounding a given last fractional pixel position that are examined to determine the optical density of pixels on pixel positions proximate to the last fractional pixel position can be variably set. For example, in the scenario of FIG. 7, the first two pixel positions and the last two pixel positions of each of a given track and its two adjacent tracks are examined to determine the optical pixel density of pixel positions proximate to the last fractional pixel position of the track. In another embodiment, for instance, the pixel positions that are within a given radius of pixel positions from a last fractional pixel position may be examined to determine the optical pixel density of pixel positions proximate to the last fractional pixel position.

Different approaches can also be used to determine the fractional threshold for the last fractional pixel position of a given track based on the optical pixel density of the pixel positions proximate to the last fractional pixel position. In one embodiment, the fractional threshold may be determined as a constant minus the determined optical pixel density. Last fractional pixel positions having greater optical pixel densities will thus have lower fractional thresholds, so that there is a greater likelihood that complete pixels will be written to such fractional pixel positions. This is desirable, because where the optical pixel density of pixel positions proximate to a last fractional pixel position is high, having a pixel written to the last fractional pixel position will more likely cause the last fractional pixel position to visually blend in with its proximate complete pixel positions.

Figure 8:
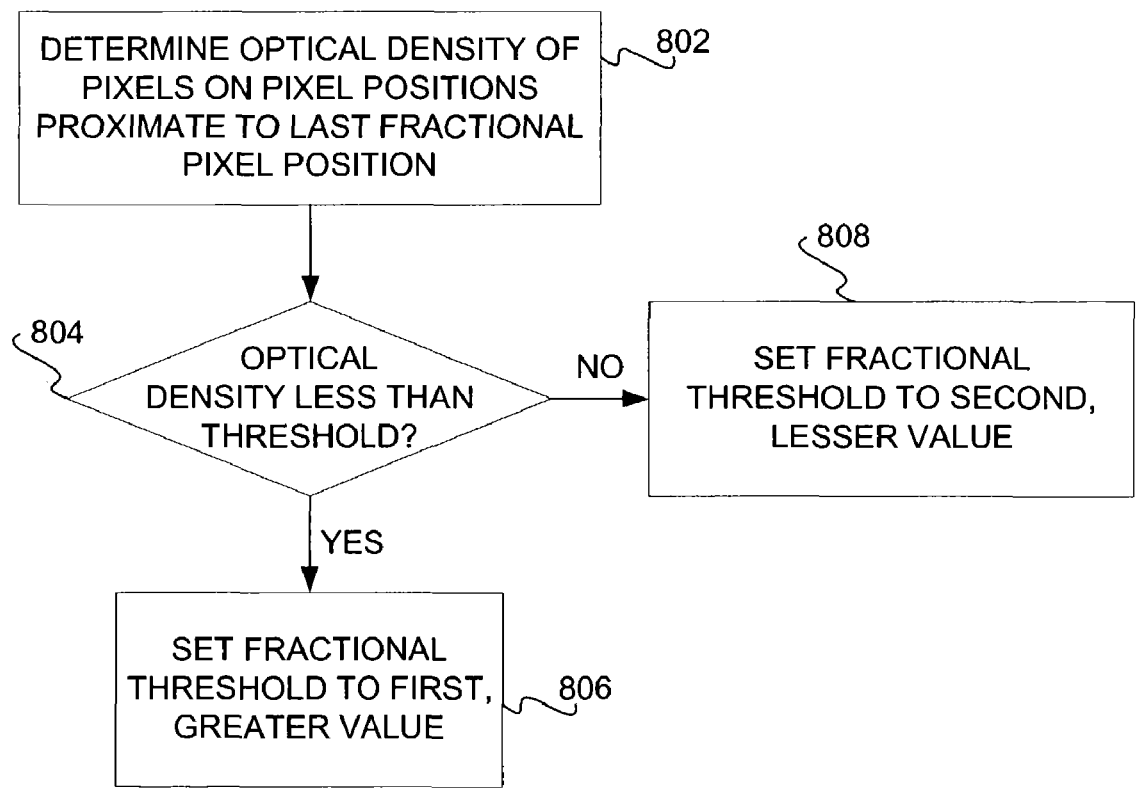
FIG. 8 is a flowchart of a method to determine the fractional threshold for the last fractional pixel position based on the optical pixel density of the complete pixel positions proximate to the last fractional pixel position, according to an embodiment of the invention.

FIG. 8 shows a method 800 for another approach to determine the fractional threshold for the last fractional pixel position of a track based on the optical pixel density of the pixel positions proximate to the last fractional pixel position, according to an embodiment of the invention. The optical density of pixels on pixel positions proximate to the last fractional pixel position is first determined (802). If the determined optical density is less than an optical density threshold (804), then the fractional threshold for the last fractional pixel position is set to a first, greater value (806).

However, if the determined optical density is greater than the optical density threshold, then the fractional threshold is set to a second, lesser value (808).

The fractional threshold can thus take on one of two different values depending on whether the optical pixel density of the pixel positions proximate to the last fractional pixel position is greater or less than a threshold. If the optical pixel density is less than the threshold, then the fractional threshold is set to the first value, which is greater than the second value, so that there is a lesser likelihood of a complete pixel being written to the last fractional pixel position. If the optical pixel density is greater than the threshold, then the fractional threshold is set to the second value, which is less than the first value, so that there is a greater likelihood of a complete pixel being written to the last fractional pixel position. As before, this allows the last fractional pixel position to have a pixel written thereto in a manner that visually blends in with its surrounding proximate complete pixel positions.

Selectively Writing to Last Fractional Pixel Positions During Multiple Track Passes Pixels are generally written to pixel positions on tracks of an optically writable label side of an optical disc, in accordance with an image, by passing over each track once, from the inside edge of the optical disc to the outside edge of the disc, and selectively writing pixels to the pixel positions on the tracks. Alternatively, however, pixels may be written to pixel positions on the tracks by passing over each track a multiple number of times. Pixels are selectively written to the pixel positions during each pass over a track. Multiply passing over each track of an optically writable label side of an optical disc can provide for grayscale and/or color images to be written to the label side, among other benefits.

Figure 9A:
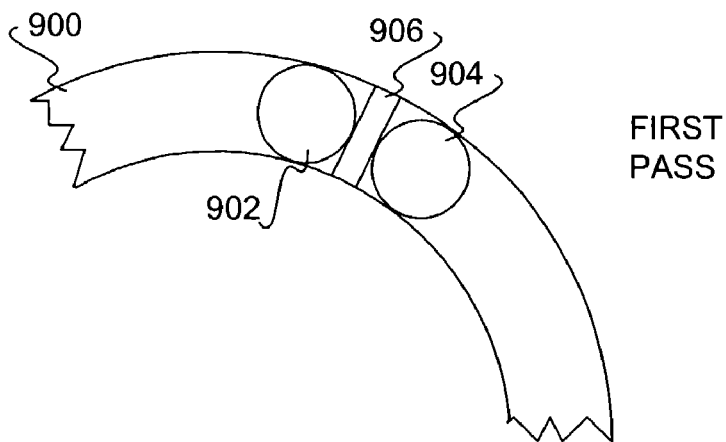
FIGS. 9A, 9B, and 9C are diagrams of a track of an optically writable label side of an optical disc and the last fractional pixel position of the track over three passes over the track, according to an embodiment of the invention.
Figure 9B:
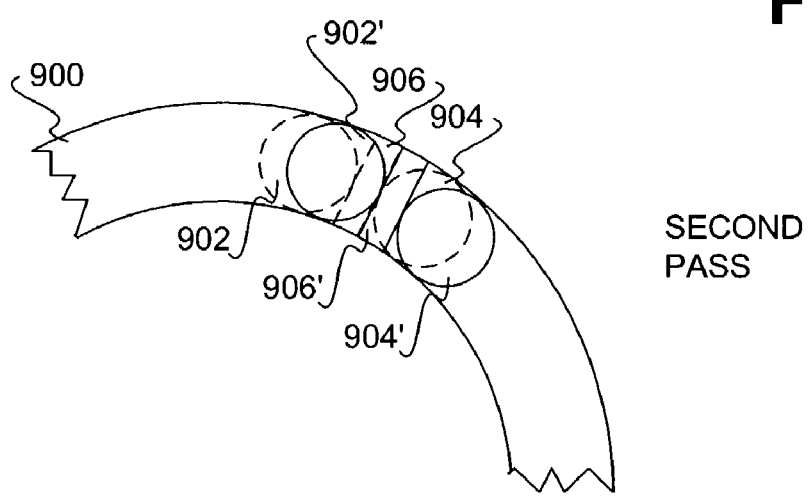
Figure 9C:
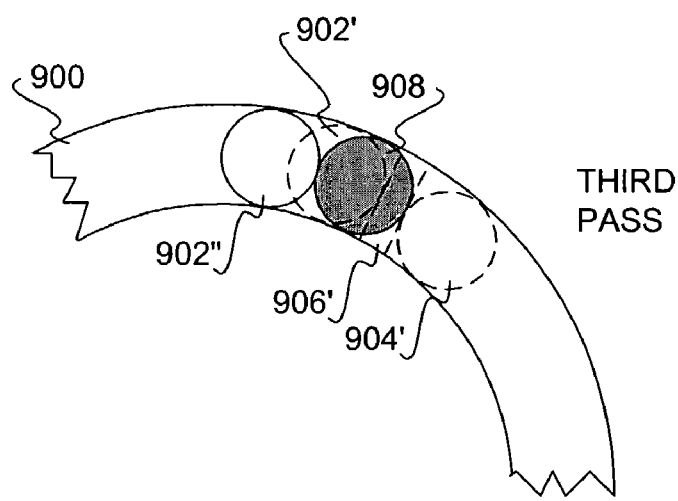

FIGS. 9A, 9B, and 9C show the last fractional pixel position for a track of an optically writable label side of an optical disc over three passes, according to an embodiment of the invention. The track 900 is on the optically writable label side of an optical disc, and can represent two of the tracks 110 of the optically writable label side 102 of the optical disc 100 of FIG. 1. In FIG. 9A, the first pass over the track 900 starts at a first complete pixel position 902 and ends at a last complete pixel position 904, leaving a last fractional pixel position 906 between the pixel positions 902 and 904. Assuming for sake of example that no complete pixel is written to the last fractional pixel position 906, the track 900 has what is referred to as an accumulated gap value after the first pass of the size, or width, of the last fractional pixel position 906. For embodiments of the invention in which there are multiple passes over each track, preferably it is the accumulated gap value after each pass that is compared against the fractional threshold, rather than the last fractional pixel position of any given pass over the track.

In FIG. 9B, the first complete pixel position 902' of the second pass begins at the end of the last complete pixel position 904 of the first pass and ends at a last complete pixel position 904', leaving a last fractional pixel position 906' between the pixel positions 902' and 904'. The pixel positions 902 and 904, and the last fractional pixel position 906, of the first pass are dotted in FIG. 9B to more clearly distinguish them from the pixel positions 902' and 904', and the last fractional pixel position 906' of the second pass, which are solid in FIG. 9B. The last fractional pixel position 906' of the second pass has a size equal to the size of the last fractional pixel position 906 of the first pass, since the passes are over the same track 900. However, the accumulated gap value after the second pass is equal to the size of the last fractional pixel position 906 plus the size of the last fractional pixel position 906'. This represents the distance between the first complete pixel position 902 of the first pass and the last complete pixel position 904' of the second pass.

Assuming that the accumulated gap value after the second pass exceeds the fractional threshold, a complete pixel is written to the last fractional pixel position 906', which overlaps the first complete pixel position 902' of the second pass, before commencing the third pass. Thus, in FIG. 9C, the complete pixel 908 has been written to the last fractional pixel position 906'. The complete pixel 908 is adjacent to the last complete pixel position 904' of the second pass, and overlaps the first complete pixel position 902' of the second pass. The third pass starts at a first complete pixel position 902" that is tangentially adjacent to the complete pixel 908 that has been written.

As a result, before the third pass begins, the accumulated gap value is decreased by the size, or width, of the complete pixel 908 that has been written, and may be a negative value. The accumulated gap value is decreased by the size of the complete pixel 908 so that the accumulated gap values equal the distance between the start of the first complete pixel position 902 of the first pass and the end of the complete pixel 908 that has just been written. The accumulated gap value is thus, at a given pass, the distance between the first complete pixel position of the first pass and the last complete pixel position of the current pass, or the complete pixel written to the last fractional pixel position of the current pass, where such a pixel has been written.

The passes over the track 900 that have been described in relation to FIGS. 9A, 9B, and 9C are therefore continuous passes. This means that one pass starts immediately adjacent to where the previous pass left off, with respect to complete pixel positions or complete pixels written to last fractional pixel positions. The accumulated gap value thus increases by the size of the last fractional pixel position over each pass, such that the first complete pixel position of one pass starts where the last complete pixel position of the previous pass ends, where a complete pixel is not written to the last fractional pixel position of a given pass. Where a complete pixel is written to the last fractional pixel position of a given pass, the size of the complete pixel is subtracted from the accumulated gap value before proceeding to the next pass, and the first complete pixel position of the next pass is defined as beginning tangentially adjacent to the complete pixel that has been written.

For instance, in FIG. 9B, the first complete pixel position 902' of the second pass begins at the end of the last complete pixel position 904 of the first pass, because no complete pixel was written to the last fractional pixel position 906 of the first pass. Furthermore, in FIG. 9C, the first complete pixel position 902" of the third pass begins at the end of the last complete pixel 908 written to the last fractional pixel position 906' of the second pass. The accumulated gap value is equal to the size of the last fractional pixel position 906 after the first pass of FIG. 9A. It is increased by the size of the last fractional pixel position 906' after the second pass of FIG. 9B, but then is decreased by the size of the complete pixel 908 written to the fractional pixel position 906' before the third pass begins in FIG. 9C.

Figure 10:
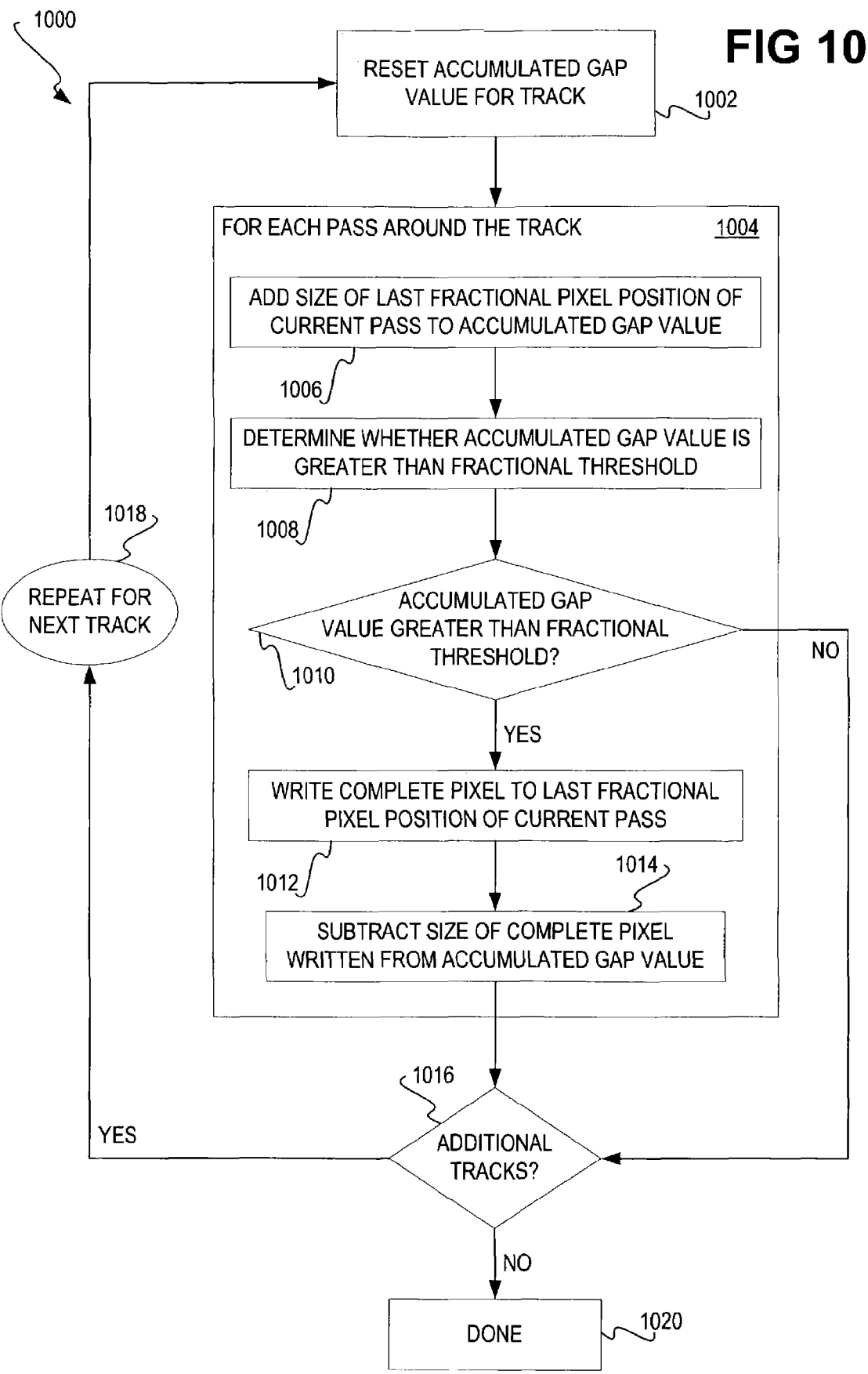
FIG. 10 is a flowchart of a method to selectively write complete pixels to the last fractional pixel positions of the tracks of an optically writable label side of an optical disc where multiple passes are made over the tracks, according to an embodiment of the invention.

FIG. 10 shows a method 1000 for selectively writing complete pixels to the last fractional pixel positions of the tracks of an optically writable label side of an optical disc where multiple passes are made over the tracks, according to an embodiment of the invention. The example scenario that has been described in relation to FIGS. 9A, 9B, and 9C can result from the performance of the method 1000. For a given track, the accumulated gap value is first reset (1002), such as by being reset to zero. For each pass of multiple passes around the track (1004), a number of tasks are then performed.

First, the size of the last fractional pixel position of the current pass is added to the accumulated gap value (1006). The last fractional pixel position of each pass over the same track is the same. Next, the method 1000 determines whether the accumulated gap value is greater than a fractional threshold (1008), which may be a static or a variable threshold, as has been described. If the accumulated gap value is greater than the fractional threshold (1010), then a complete pixel is written to the last fractional pixel position of the current pass (1012), such that in cases where the complete pixel is sampled from an image, in some situations no pixel will actually be written, where the sampled pixel from the image is a completely white pixel. The size of the complete pixel that has been written, such as its width, is then subtracted from the accumulated gap value (1014).

As before, the complete pixel that has been written to the last fractional position may have been sampled from the image to be correspondingly and selectively written, over multiple passes, to the tracks of the optically writable label side of the optical disc. Once all the passes around a given track have been accomplished, if there are any additional tracks (1016), then the method 1000 is repeated for the next track (1018). Ultimately, the method 1000 is finished (1020).

Mass Storage Device and Conclusion

Figure 11:
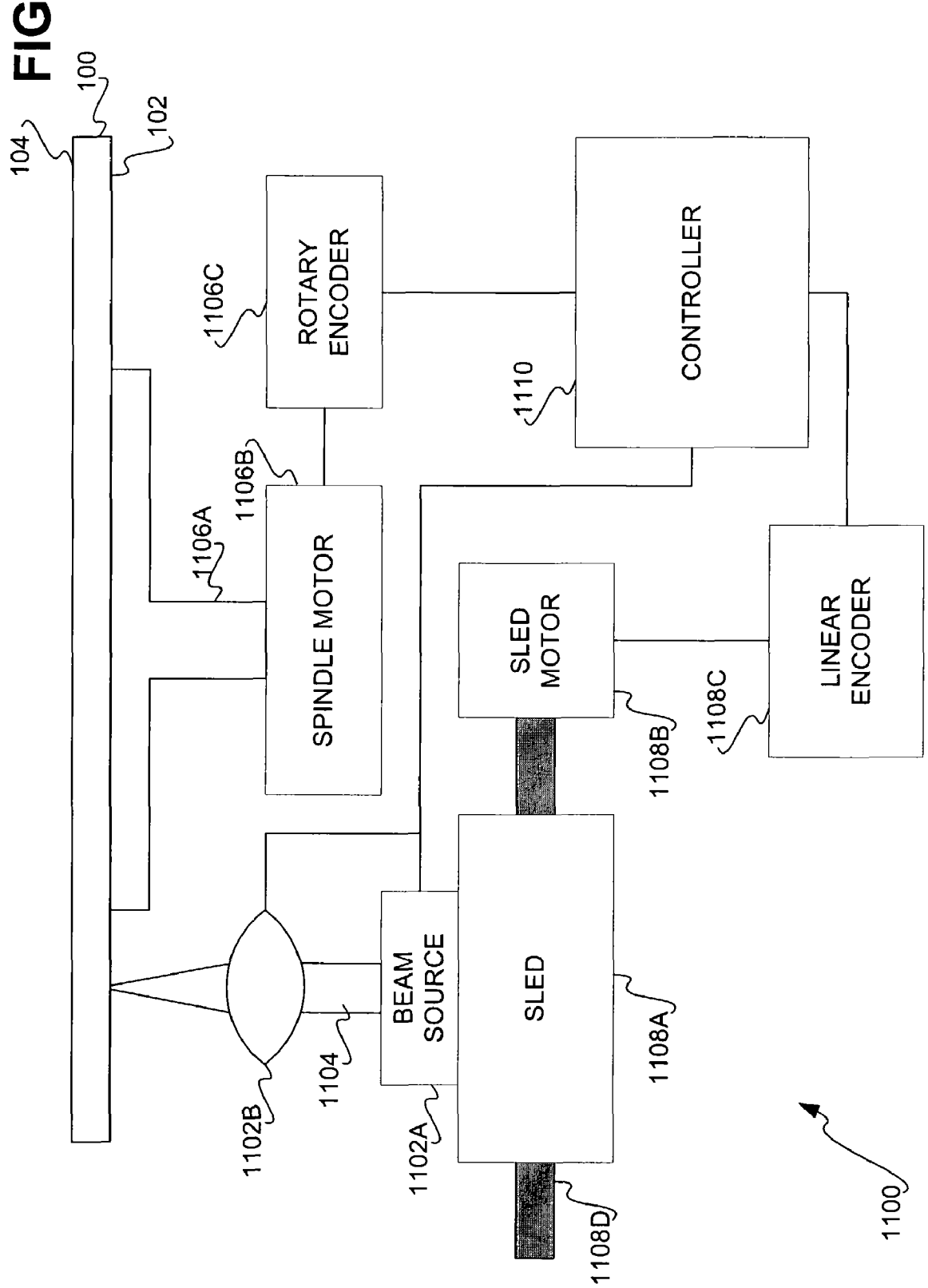
FIG. 11 is a diagram of a mass storage device, according to an embodiment of the invention.

FIG. 11 shows a mass storage device 1100, according to an embodiment of the invention. The mass storage device 1100 is for reading from and/or writing to the optical disc 100. More specifically, the mass storage device 1100 is for reading from and/or writing to an optically writable data region of the optical disc 100, and/or an optically writable label region of the optical disc 100. The mass storage device 1100 includes a beam source 1102A and an-objective lens 1102B, which are collectively referred to as the optical marking mechanism 1102. The storage device 1100 also includes a spindle 1106A, a spindle motor 1106B, and a rotary encoder 1106C, which are collectively referred to as the first motor mechanism 1106. The device 1100 includes a sled 1108A, a sled motor 1108B, a linear encoder 1108C, and a rail 1108D, which are collectively referred to as the second motor mechanism 1108. Finally, the mass storage device 1100 includes a controller 1110.

The optical marking mechanism 1102 focuses an optical beam 1104 on the optical disc 100, for at least marking the label side 102 of the optical disc 100, and which also may be used to read from the label side 102 of the disc 100, as well as read from and/or write to the data side 104 of the disc 100. Specifically, the beam source 1102A generates the optical beam 1104, which is focused through the objective lens 1102B onto the optical disc 100, such as in a manner known to those of ordinary skill within the art.

The first motor mechanism 1106 rotates the optical disc 100. Specifically, the optical disc 100 is situated on the spindle 1106A, which is rotated, or moved, by the spindle motor 1106B to a given position specified by the rotary encoder 1106C communicatively coupled to the spindle motor 1106B. The rotary encoder 1106C may include hardware, software, or a combination of hardware and software.

The second motor mechanism 1108 moves the optical marking mechanism 1102 radially relative to the optical disc 100. Specifically, the optical marking mechanism 1102 is situated on the sled 1108A, which is moved on the rail 1108D by the sled motor 1108B to a given position specified by the linear encoder 1108C communicatively coupled to the sled motor 1108B. The linear encoder 1108C may include hardware, software, or a combination of hardware and software.

The controller 1110 controls the marking mechanism 1102 and the motor mechanisms 1106 and 1108 to cause markings, or pixels, to be written to pixel, or marking, positions on the tracks of optical writable label side 102 of the optical disc 100, such as in accordance with an image to be written to the tracks of the label side 102. The controller 1110 may also control the marking mechanism 1102 and the motor mechanisms 1106 and 1108 to write data to the data side 104 of the optical disc 100. In one embodiment, the controller 1110 may selectively write markings, or pixels, to last fractional marking, or pixel, positions of the tracks of the label side 102 of the optical disc 100, as has been described in the preceding sections of the detailed description. The controller 1110 may include hardware, software, or a combination of hardware and software.

In addition, the controller 1110 may include firmware, or more generally the mass storage device 1100 may include firmware, that is capable of being upgraded. Thus, in one embodiment, a computer program that is stored on a computer-readable medium can be performed to upgrade the firmware. This entails transferring the firmware to the mass storage device 1100, such as to the controller 1110 thereof. For example, the firmware may enable the mass storage device 1100 generally, and the controller 1110 thereof specifically, the selectively write markings, or pixels, to last fractional marking, or pixel positions of the tracks of the label side 102 of the optical disc 100, as has been described.

As can be appreciated by those of ordinary skill within the art, the components depicted in the mass storage device 1100 are representative of one embodiment of the invention, and do not limit all embodiments of the invention. Other approaches can also be employed. As only one example, the sled 1108A may be positioned with the sled motor 1108B, with finer adjustment obtained using a voice coil attached to the beam source 1102A and/or the objective lens 1102B.

Figure 12:
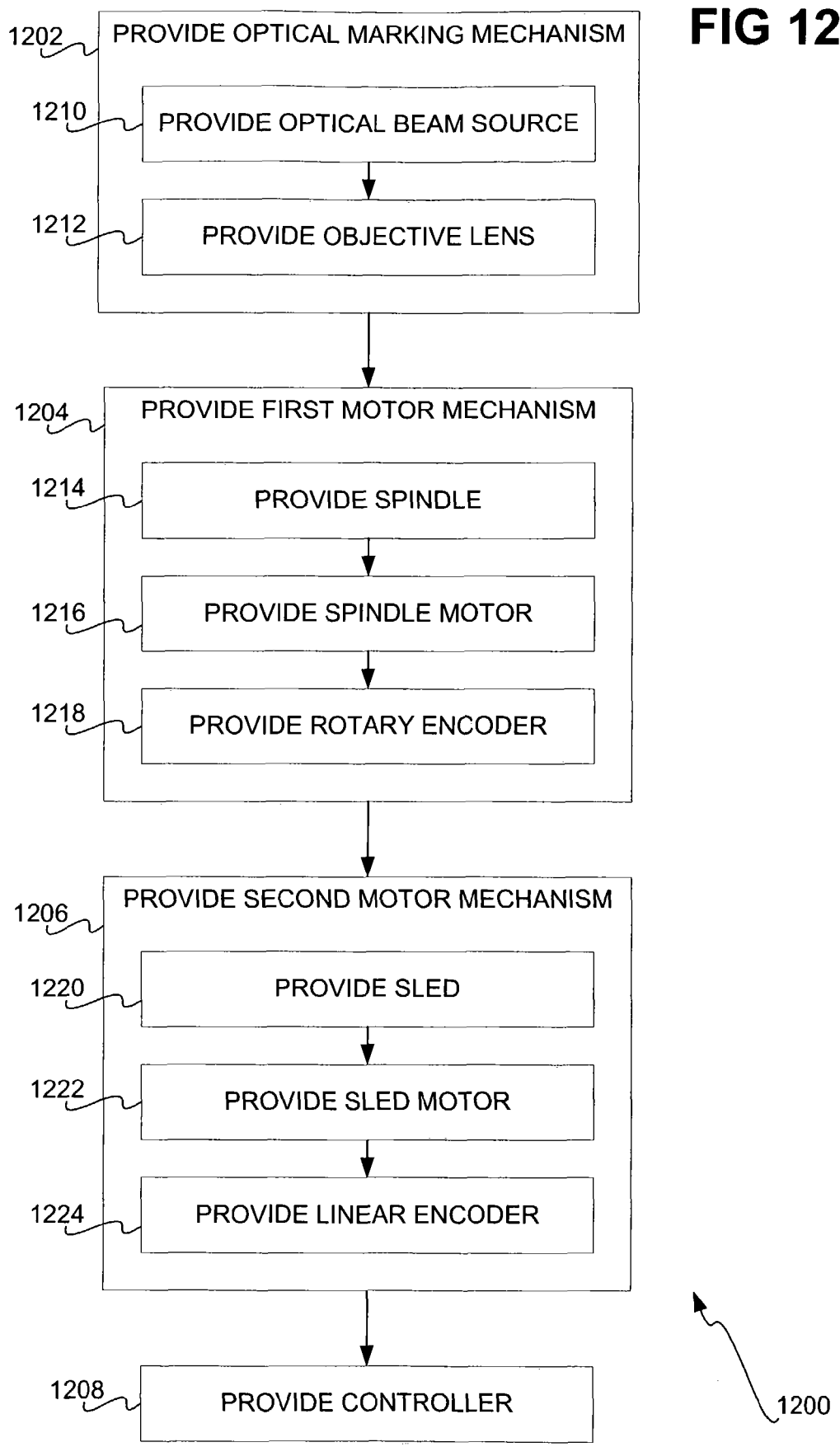
FIG. 12 is a flowchart of a method for manufacturing the mass storage device of FIG. 11, according to an embodiment of the invention.

FIG. 12 shows a method of manufacture 1200 for the mass storage device 1100 of FIG. 11, according to an embodiment of the invention. The method 1200 includes providing the optical marking mechanism 1102 (1202), providing the first motor mechanism 1106 (1204), providing the second motor mechanism 1108 (1206), and providing the controller 1110 (1208). In one embodiment, providing the optical marking mechanism 1102 includes providing the optical beam source 1102A (1210) and the objective lens 1102B (1212), whereas providing the first motor mechanism 1106 in one embodiment includes providing the spindle 1106A (1214), the spindle motor 1106B (1216), and the rotary encoder 1106C (1218). Finally, providing the second motor mechanism 1108 in one embodiment includes providing the sled 1108A (1220), the sled motor 1108B (1222), and the linear encoder 1108C (1224).

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

I claim:

1. A method comprising:

for a track of an optically writable label region of an optical disc having a non-integer number of pixel positions around the track such that a last fractional pixel position is defined, determining whether a size of the last fractional pixel position is greater than a fractional threshold; and, in response to determining that the size of the last fractional pixel position is greater than the fractional threshold, writing a complete pixel to the last fractional pixel position, such that the complete pixel written overlaps onto a first complete pixel position of the track.

2. The method of claim 1, wherein determining whether the size of the last fractional pixel position is greater than the fractional threshold comprises determining whether a width of the last fractional pixel position is greater than the fractional threshold.

3. The method of claim 1, wherein determining whether the size of the last fractional pixel position is greater than the fractional threshold comprises determining whether the size of the last fractional pixel position is greater than a static fractional threshold.

4. The method of claim 1, further comprising dynamically determining the fractional threshold based on an optical density of pixels on pixel positions proximate to the last fractional pixel position.

5. The method of claim 1, further comprising dynamically determining the fractional threshold based on a metric of lightness and darkness of pixels on pixel positions proximate to the last fractional pixel position.

6. The method of claim 5, wherein determining the fractional threshold based on the optical density of pixels on pixel positions proximate to the last fractional pixel position comprises determining the fractional threshold as a constant from which the optical density of pixels on pixel positions proximate to the last fractional pixel position is subtracted.

7. The method of claim 5, wherein determining the fractional threshold based on the optical density of pixels on pixel positions proximate to the last fractional pixel position comprises:

setting the fractional threshold to a first value where the optical density of pixels on pixel positions proximate to the last fractional pixel position is less than an optical density threshold; and, setting the fractional threshold to a second value less than the first value where the optical density of pixels on pixel positions proximate to the last fractional pixel position is greater than the optical density threshold.

8. The method of claim 1, wherein writing the complete pixel to the last fractional pixel position comprises first sampling the complete pixel to be written to the last fractional pixel position from an image to be written onto the optically writable label region of the optical disc.

9. The method of claim 1, further comprising repeating determining whether the size of the last fractional pixel position is greater than the fractional threshold, and in response to determining that the size of the last fractional pixel position is greater than the fractional threshold, writing the complete pixel to the last fractional pixel position, for each of a plurality of other tracks of the optically writable label region of the optical disc.

10. A method comprising:

resetting an accumulated gap value for a track of an optically writable label region of an optical disc having a non-integer number of pixel positions around the track;

for each continuous pass of a plurality of continuous passes around the track to selectively write pixels to pixel positions around the track:

adding a size of a last fractional pixel position of the pass to the accumulated gap value;

determining whether the accumulated gap value is greater than a fractional threshold;

in response to determining that accumulated gap value is greater than the fractional threshold, writing a complete pixel to the last fractional pixel position of the pass, such that the complete pixel written overlaps onto a first complete pixel position of the pass, and a first complete pixel position for a next pass is defined as adjacent to the complete pixel written; and, subtracting the size of the complete pixel written from the accumulated gap value.

11. The method of claim 10, wherein resetting the accumulated gap value comprises setting the accumulate gap value to zero.

12. The method of claim 10, wherein adding the size of the last fractional pixel position of the pass to the accumulated gap value comprises adding a width of the last fractional pixel position of the pass to the accumulated gap value.

13. The method of claim 10, wherein determining whether the accumulated gap value is greater than the fractional threshold determining whether the accumulated gap value is greater than a static fractional threshold.

14. The method of claim 10, wherein determining whether the accumulated gap value is greater than the fractional threshold determining whether the accumulated gap value is greater than a dynamic fractional threshold.

15. The method of claim 14, wherein determining whether the accumulated gap value is greater than the dynamic fractional threshold comprises determining whether the accumulated gap value is greater than a two-valued fractional threshold having a first value where an optical density of pixels on pixel positions of the pass proximate to the last fractional pixel position of the pass is less than an optical density threshold and a second value less than the first value and where the optical density is greater than the optical density threshold.

16. The method of claim 14, wherein determining whether the accumulated gap value is greater than the dynamic fractional threshold comprises determining whether the accumulated gap value is greater than a constant from which an optical density of pixels on pixel positions of the pass proximate to the last fractional pixel position of the pass is subtracted.

17. The method of claim 10, wherein subtracting the size of the complete pixel written from the accumulated gap value comprises subtracting a width of the complete pixel written from the accumulated gap value.

18. The method of claim 10, wherein writing the complete pixel to the last fractional pixel position of the pass first comprises sampling the complete pixel to be written to the last fractional pixel position of the pass from an image to be written onto the optically writable label region of the optical disc.

19. The method of claim 10, further comprising repeating resetting the accumulated gap value and, for each continuous pass of a plurality of continuous passes around the track, adding the size of the last fractional pixel position of the pass to the accumulated gap value, determining whether the accumulated gap value is greater than the fractional threshold, and in response to determining that the accumulated gap value is greater than the fractional threshold, writing the complete pixel to the last fractional pixel position of the pass and subtracting the size of the complete pixel written from the accumulated gap value, for each of a plurality of other tracks of the optically writable label region of the optical disc.

20. An optical disc comprising:
an optically writable label side;
a plurality of concentric tracks on the optically writable label side;
a plurality of pixel positions on each of the plurality of concentric tracks on which pixels of an image are correspondingly and selectively optically written; and,
a last fractional pixel position of the plurality of pixel positions on each of at least one of the plurality of concentric tracks, the last fractional pixel position having a pixel written thereto that overlaps a first complete pixel position of the plurality of pixel positions where the last fractional pixel position has a size exceeding a threshold.

21. The optical disc of claim 20, further comprising an optically writable data side opposite to the optically writable label side.

22. The optical disc of claim 20, wherein the pixel written to the last fractional position is sampled from the image.

23. The optical disc of claim 20, wherein the threshold is static.

24. The optical disc of claim 20, wherein the threshold is variable.

25. The optical disc of claim 24, wherein the threshold for the last fractional pixel position of each track is based on an optical density of pixels on pixel positions proximate to the last fractional pixel position.

26. The optical disc of claim 24, wherein the threshold for the last fractional pixel position of each track is based on a metric of lightness and darkness of pixels on pixel positions proximate to the last fractional pixel position.

27. The optical disc of claim 20, wherein the pixels of the image are correspondingly and selectively optically written on each of the plurality of concentric tracks over a plurality of passes, each pass having a plurality of pixel positions that is continuous with a plurality of pixel positions of an adjacent pass, a last fractional pixel position of the plurality of pixel positions of each pass having a pixel written thereto where an accumulated fractional pixel position gap for the track exceeds the threshold.

28. A mass storage device comprising:
an optical marking mechanism to at least optically write markings on a plurality of tracks of an optically writable label side of an optical disc; and,
a controller to selectively write markings to last fractional marking positions of the tracks that overlap first complete marking positions of the tracks.

29. The mass storage device of claim 28, wherein the controller is to write a marking to the last fractional marking position of a track where the last fractional marking position has a size greater than a threshold.

30. The mass storage device of claim 29, wherein the threshold is variable.

31. The mass storage device of claim 30, wherein the threshold for the last fractional marking position of each track is based on an optical density of markings on marking positions proximate to the last fractional marking position.

32. A mass storage device comprising:
means for optically writing pixels on a plurality of tracks of an optically writable label side of an optical disc; and,
means for selectively writing pixels to last fractional pixel positions of the tracks that overlap first complete pixel positions of the tracks.

33. The mass storage device of claim 32, wherein the means for selectively writing the pixels to the last fractional pixel positions of the tracks is for writing a pixel to a last fractional pixel position of a track where the last fractional pixel position has a size greater than a threshold.

34. A method for manufacturing a mass storage device comprising:
providing an optical marking mechanism that is able to at least optically write markings on a plurality of tracks of an optically writable label side of an optical disc;
providing a plurality of motor mechanisms that is able to rotate the optical disc and to move the optical marking mechanism radially relative to the optical disc; and,
providing a controller that is able to write a marking to a last fractional marking position of each track that overlaps a first complete marking position of the track where the last fractional marking position has a size greater than a threshold.

35. A computer-readable medium comprising:
a computer program stored on the computer-readable medium,
the computer program configured to perform a method comprising transferring firmware to a mass storage device that has an optical marking mechanism that is able to at least optically write markings on a plurality of tracks of an optically writable label side of an optical disc,
wherein the firmware allows the mass storage device to be able to write a marking to a last fractional marking position of each track that overlaps a first complete marking position of the track where the last fractional marking position has a size greater than a threshold.

* * * * *